(12) United States Patent
Tao

(10) Patent No.: US 11,964,783 B2
(45) Date of Patent: Apr. 23, 2024

(54) APPARATUS AND METHOD FOR DELIVERING A PAYLOAD

(71) Applicant: Aurora Flight Sciences Corporation, Manassas, VA (US)

(72) Inventor: Tony Shuo Tao, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 92 days.

(21) Appl. No.: 17/409,887

(22) Filed: Aug. 24, 2021

(65) Prior Publication Data
US 2023/0063152 A1    Mar. 2, 2023

(51) Int. Cl.
| | | |
|---|---|---|
| *B64U 70/20* | (2023.01) | |
| *B64C 39/02* | (2023.01) | |
| *B64D 1/12* | (2006.01) | |
| *B64U 10/25* | (2023.01) | |
| *B64U 80/82* | (2023.01) | |
| *B64U 101/60* | (2023.01) | |

(52) U.S. Cl.
CPC ............ *B64U 70/20* (2023.01); *B64C 39/024* (2013.01); *B64D 1/12* (2013.01); *B64U 10/25* (2023.01); *B64U 80/82* (2023.01); *B64U 2101/60* (2023.01); *B64U 2201/104* (2023.01)

(58) Field of Classification Search
CPC .... B64U 70/20; B64U 2201/104; B64D 1/12; B64C 39/024
See application file for complete search history.

(56) References Cited

U.S. PATENT DOCUMENTS

| | | | | |
|---|---|---|---|---|
| 6,056,237 | A  * | 5/2000 | Woodland | F42B 12/365 |
| | | | | 244/49 |
| 6,082,675 | A  * | 7/2000 | Woodall, Jr. | F42B 12/365 |
| | | | | 244/49 |
| 10,913,534 | B1 * | 2/2021 | Brum | B64D 1/02 |
| 11,390,382 | B1 * | 7/2022 | Anderson | B64D 17/80 |
| 2004/0089767 | A1 * | 5/2004 | Harrison | B64D 39/06 |
| | | | | 244/137.4 |
| 2015/0266578 | A1 * | 9/2015 | Elkins | B64C 39/024 |
| | | | | 244/137.1 |
| 2015/0353197 | A1 * | 12/2015 | Alber | B64C 29/0008 |
| | | | | 244/2 |
| 2016/0152339 | A1 * | 6/2016 | von Flotow | B64D 3/00 |
| | | | | 244/2 |
| 2019/0100312 | A1 * | 4/2019 | Fen | B64U 30/10 |
| 2019/0315462 | A1 * | 10/2019 | Skladman | B64C 25/24 |
| 2020/0115055 | A1 * | 4/2020 | Kuperman | F42B 12/56 |
| 2021/0107652 | A1 * | 4/2021 | Velazquez | B64D 1/10 |
| 2022/0308596 | A1 * | 9/2022 | Morris | B64U 70/20 |
| 2022/0324572 | A1 * | 10/2022 | Alzahrani | B64D 5/00 |

* cited by examiner

*Primary Examiner* — Michael H Wang
(74) *Attorney, Agent, or Firm* — McDonnell Boehnen Hulbert & Berghoff LLP

(57) ABSTRACT

Examples include an apparatus for delivering a payload. The apparatus includes a first autonomous vehicle and a second autonomous vehicle that are configured to be coupled to an aircraft. The first autonomous vehicle includes a wing and a first propulsion system configured to deliver the second autonomous vehicle to a first destination. The second autonomous vehicle includes a payload and a second propulsion system configured to deliver the payload to a second destination.

20 Claims, 7 Drawing Sheets

```
┌─────────────────────────────────────────────────────────┐
│  DETACHING A FIRST AUTONOMOUS VEHICLE FROM AN AIRCRAFT  │
│              DURING FLIGHT OF THE AIRCRAFT              │
└─────────────────────────────────────────────────────────┘
       402 ↓

┌─────────────────────────────────────────────────────────┐
│  NAVIGATING THE FIRST AUTONOMOUS VEHICLE TO DELIVER A   │
│   SECOND AUTONOMOUS VEHICLE TO A FIRST DESTINATION      │
└─────────────────────────────────────────────────────────┘
       404 ↓

┌─────────────────────────────────────────────────────────┐
│   DETACHING THE SECOND AUTONOMOUS VEHICLE FROM THE      │
│              FIRST AUTONOMOUS VEHICLE                   │
└─────────────────────────────────────────────────────────┘
       406 ↓

┌─────────────────────────────────────────────────────────┐
│  NAVIGATING THE SECOND AUTONOMOUS VEHICLE TO DELIVER A  │
│          PAYLOAD TO A SECOND DESTINATION                │
└─────────────────────────────────────────────────────────┘
       408
                                                      ↖ 400
```

FIG. 6

RECEIVING A COMMAND TO DETACH THE FIRST AUTONOMOUS VEHICLE FROM THE AIRCRAFT

THE FIRST AUTONOMOUS VEHICLE RECEIVING INFORMATION INDICATING THE FIRST DESTINATION

DETERMINING THAT THE FIRST AUTONOMOUS VEHICLE HAS REACHED THE FIRST DESTINATION

THE SECOND AUTONOMOUS VEHICLE DETERMINING THE SECOND DESTINATION

APPARATUS AND METHOD FOR DELIVERING A PAYLOAD

FIELD

The present disclosure generally relates to autonomous vehicles, and more specifically to unmanned aerial vehicles configured for delivering a payload.

BACKGROUND

In some situations an aircraft can be used to deliver supplies to people on the ground. This task can be cumbersome if the aircraft must deliver such supplies to multiple dispersed locations. Thus, a need exists to more efficiently deliver such supplies to multiple locations.

SUMMARY

One aspect of the disclosure is an apparatus for delivering a payload, the apparatus comprising: a first autonomous vehicle and a second autonomous vehicle that are configured to be coupled to an aircraft, the first autonomous vehicle comprising: a wing; and a first propulsion system configured to deliver the second autonomous vehicle to a first destination, the second autonomous vehicle comprising: a payload; and a second propulsion system configured to deliver the payload to a second destination.

Another aspect of the disclosure is a system for delivering a payload, the system comprising: an aircraft; and a first autonomous vehicle and a second autonomous vehicle that are coupled to the aircraft, the first autonomous vehicle comprising: a wing; and a first propulsion system configured to deliver the second autonomous vehicle to a first destination, the second autonomous vehicle comprising: a payload; and a second propulsion system configured to deliver the payload to a second destination.

Another aspect of the disclosure is a method for delivering a payload, the method comprising: detaching a first autonomous vehicle from an aircraft during flight of the aircraft; navigating the first autonomous vehicle to deliver a second autonomous vehicle to a first destination; detaching the second autonomous vehicle from the first autonomous vehicle; and navigating the second autonomous vehicle to deliver a payload to a second destination.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 6 is a block diagram of a method, according to an example.

FIG. 7 is a block diagram of a method, according to an example.

FIG. 8 is a block diagram of a method, according to an example.

FIG. 9 is a block diagram of a method, according to an example.

FIG. 10 is a block diagram of a method, according to an example.

DETAILED DESCRIPTION

Within examples, a system includes an aircraft and an apparatus that includes a first autonomous vehicle and a second autonomous vehicle. The aircraft can generally be any type of aircraft, the first autonomous vehicle can be a winged unmanned aerial vehicle (UAV) (e.g., powered by a jet engine), and the second autonomous vehicle can be a UAV powered by a jet engine, a rocket engine, or the like. The first autonomous vehicle and the second autonomous vehicle are coupled to the aircraft.

During flight of the aircraft, the first autonomous vehicle detaches (e.g., launches) from the aircraft and carries the second autonomous vehicle to a first destination. The first destination could be a location that is within a threshold distance of a second destination that is designated for payload delivery. More specifically, the first destination could be determined such that the distance between the first destination and the second destination is smaller by at least a predetermined margin than a cruising range of the second autonomous vehicle. Once the first autonomous vehicle is within the threshold distance of the second destination, the second autonomous vehicle is launched from the first autonomous vehicle and carries the payload to the second destination.

Within examples, the aircraft could carry multiple apparatus that each include a first autonomous vehicle and a second autonomous vehicle. The aircraft could launch multiple first autonomous vehicles toward multiple destinations with second autonomous vehicles detaching from the respective first autonomous vehicles to make a final leg of the payload delivery. For example, the first autonomous vehicles could be primarily designed for cruising and the second autonomous vehicles could be primarily designed for descent to the final destination. This could make delivering payloads to multiple locations quick and efficient.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-5 are diagrams of structures and functionality related to a system 10 and an apparatus 150.

Figure 1:
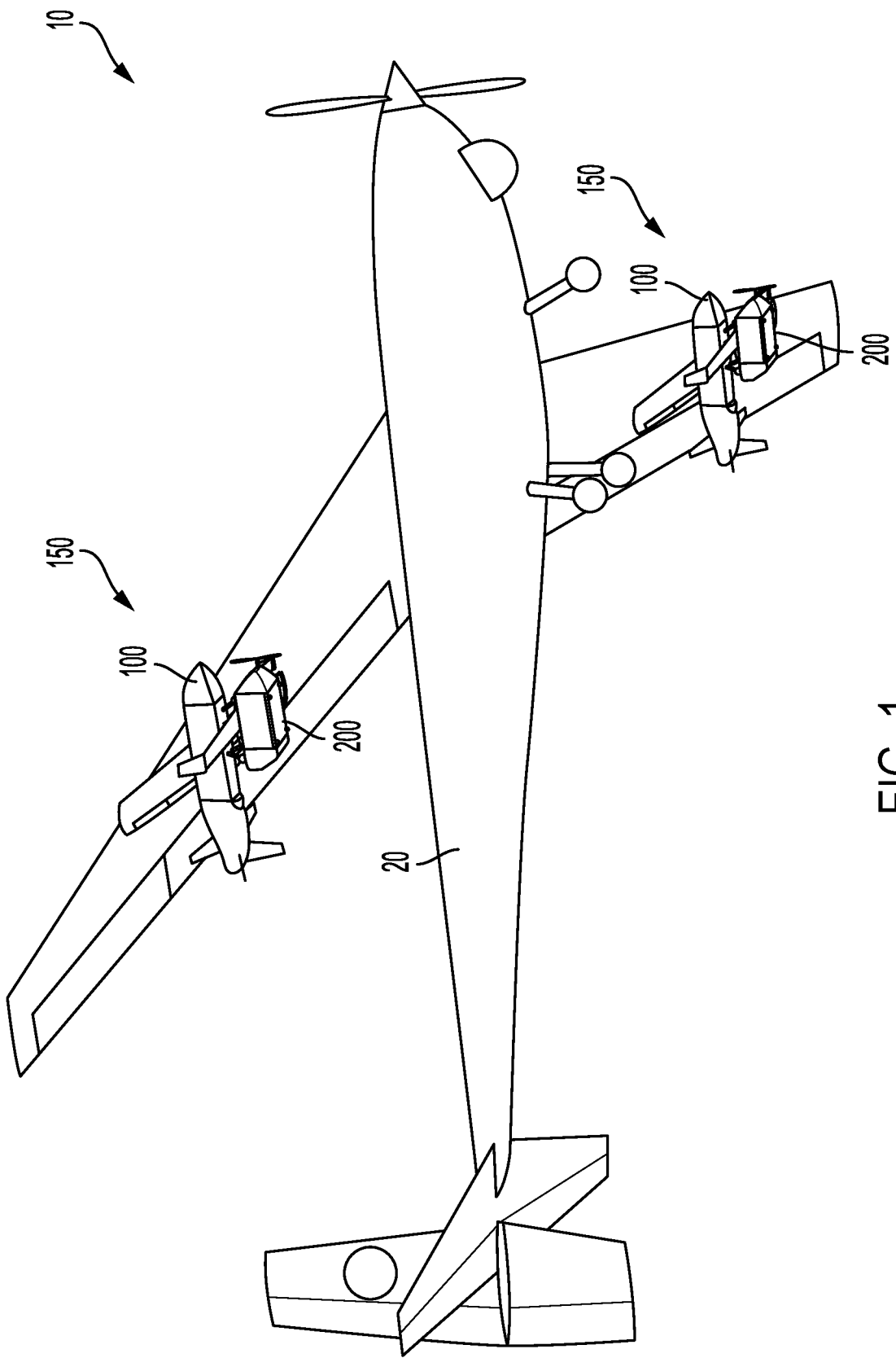
FIG. 1 is a perspective view of a system that includes an aircraft, according to an example.

FIG. 1 is a perspective view of the system 10 that includes an aircraft 20 and two apparatus 150. In other examples, the system 10 includes one or more additional apparatus 150. In FIG. 1, the aircraft 20 is shown as propeller driven, but the aircraft 20 could also take other forms. Each apparatus 150 includes a first autonomous vehicle 100 and a second autonomous vehicle 200 that are coupled to the aircraft 20 (e.g., a wing of the aircraft 20).

Figure 2:
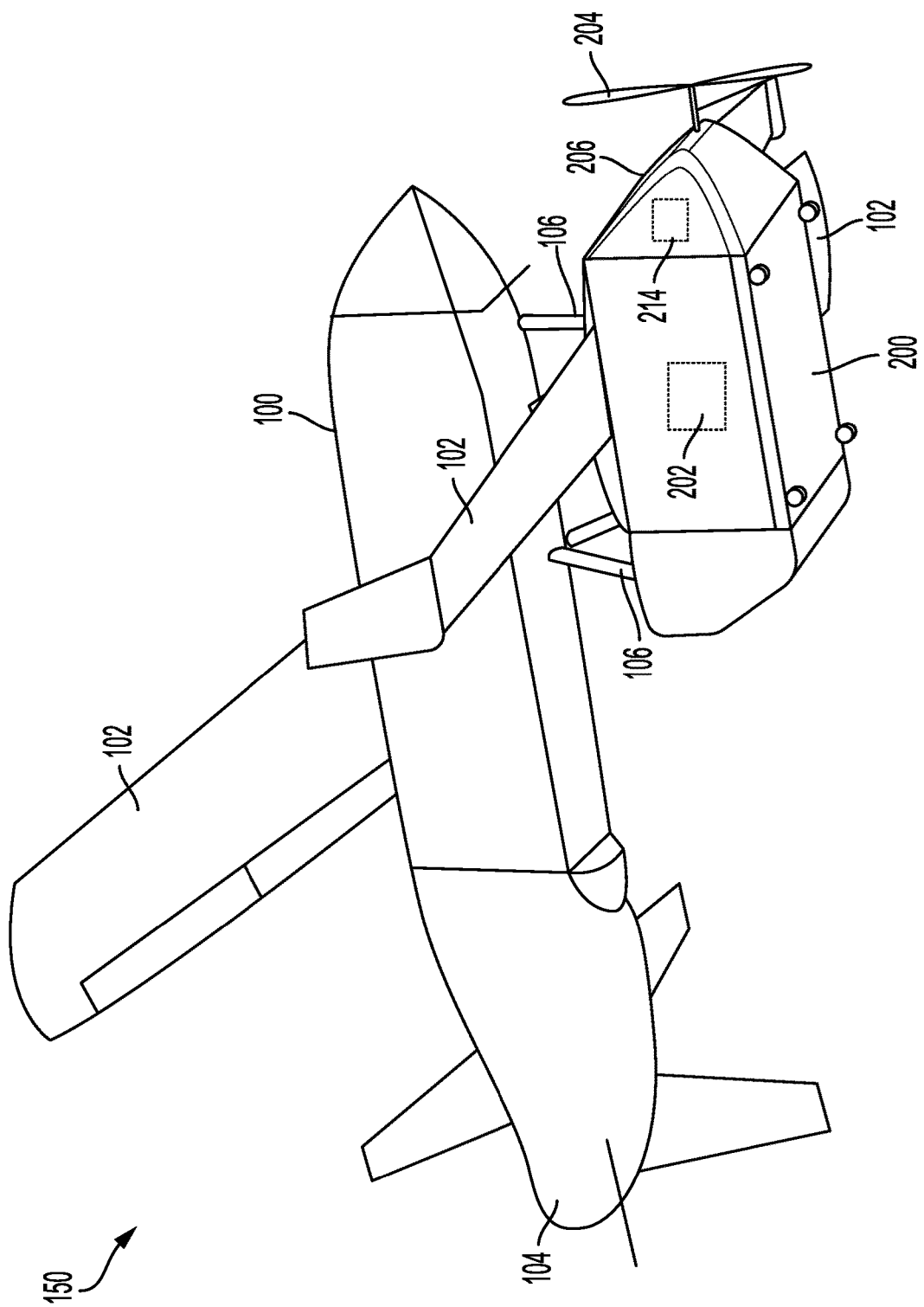
FIG. 2 is an underside view of an apparatus, according to an example.

FIG. 2 is an underside view of the apparatus 150. As shown, the first autonomous vehicle 100 and the second autonomous vehicle 200 each include a wing 102.

The first autonomous vehicle 100 also includes a first propulsion system 104 (e.g., a jet engine).

A support structure 106 is configured for coupling the first autonomous vehicle 100 (e.g., the wing 102) and the second autonomous vehicle 200 to each other. The support structure 106 typically takes the form of metal or fiberglass beams or another structure configured for supporting the weight of the second autonomous vehicle 200 during flight of the aircraft 20 and/or during flight of the first autonomous vehicle 100.

The second autonomous vehicle 200 includes a payload 202 and a second propulsion system 204 (e.g., a propeller). As shown, a nose 206 of the second autonomous vehicle 200 extends beyond the first autonomous vehicle 100 (e.g., the wing 102 of the first autonomous vehicle 100).

In some examples, a second tracking system 214 is located within the nose 206. This position can allow for the second tracking system 214 to function (e.g., send and/or receive electromagnetic signals without obstruction) while the second autonomous vehicle 200 is coupled to the first autonomous vehicle 100.

Figure 3:
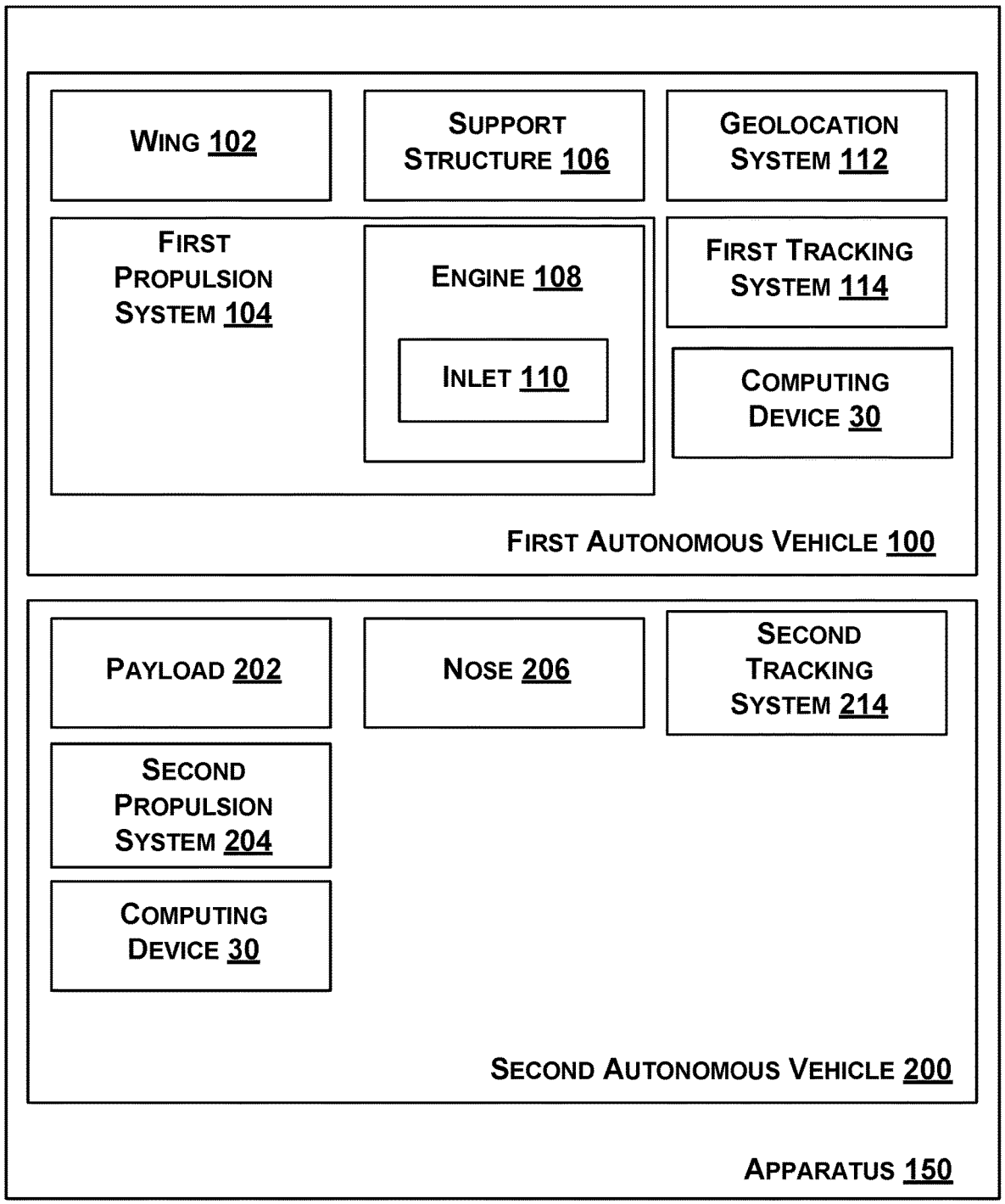
FIG. 3 is a block diagram of an apparatus, according to an example.

FIG. 3 is a block diagram of the apparatus 150 for delivering the payload 202. The apparatus 150 includes the first autonomous vehicle 100 and the second autonomous vehicle 200 that are configured to be coupled to the aircraft 20. The first autonomous vehicle 100 includes the wing 102 and the first propulsion system 104 configured to deliver the second autonomous vehicle 200 to a first destination.

The wing 102 is a typically made of fiberglass or other composite materials and is shaped in way to provide lift for the first autonomous vehicle 100.

The first propulsion system 104 includes an engine 108 that further includes an inlet 110. For example, the engine 108 is a jet engine that provides thrust for the first autonomous vehicle 100 using air received into the inlet 110.

The first autonomous vehicle 100 also includes a computing device 30, the support structure 106, a geolocation system 112, and a first tracking system 114. The computing device 30 is described in more detail below with reference to other figures.

The geolocation system 112 is configured to determine a location of the first autonomous vehicle 100. Typically, the geolocation system 112 is a global positioning system (GPS) receiver that is in communication with the computing device 30.

The first tracking system 114 is configured to determine that the first autonomous vehicle 100 and the second autonomous vehicle 200 have reached the first destination. The first tracking system 114 could be an active, semi-active, or passive radar system, a GPS system, or an infrared (e.g., heat-seeking) tracking system.

The second autonomous vehicle 200 includes the payload 202 and the second propulsion system 204 configured to deliver the payload 202 to a second destination. The second autonomous vehicle 200 also includes a computing device 30, the nose 206, and a second tracking system 214. The computing device 30 is described in more detail below with reference to other figures.

In various examples, the payload 202 can include medical supplies or food. Other examples are possible.

The second propulsion system 204 generally includes a propeller or a solid-propellant rocket, but other examples are possible, including any example listed above for the first propulsion system 104.

The second tracking system 214 is configured to determine that the second autonomous vehicle 200 has reached the second destination. The second tracking system 214 could be an active, semi-active, or passive radar system, a GPS system, or an infrared (e.g., heat-seeking) tracking system.

Figure 4:
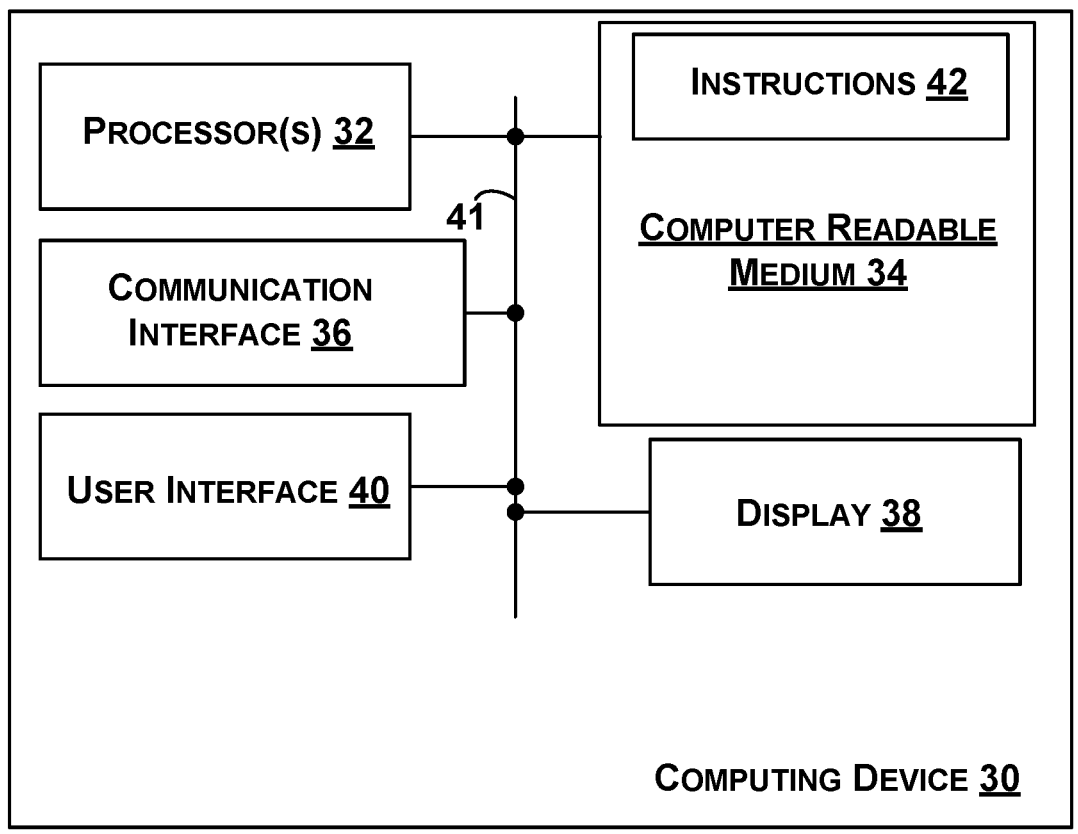
FIG. 4 is a block diagram of a computing device, according to an example.

FIG. 4 is a block diagram of the computing device 30. The computing device 30 includes one or more processors 32, a non-transitory computer readable medium 34, a communication interface 36, a display 38, and a user interface 40. Components of the computing device 30 are linked together by a system bus, network, or other connection mechanism 41.

The one or more processors 32 can be any type of processor(s), such as a microprocessor, a digital signal processor, a multicore processor, etc., coupled to the non-transitory computer readable medium 34.

The non-transitory computer readable medium 34 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 34 can be configured to store instructions 42. The instructions 42 are executable by the one or more processors 32 to cause the computing device 30 to perform any of the functions or methods described herein.

The communication interface 36 can include hardware to enable communication within the computing device 30 and/or between the computing device 30 and one or more other devices. The hardware can include transmitters, receivers, and antennas, for example. The communication interface 36 can be configured to facilitate communication with one or more other devices, in accordance with one or more wired or wireless communication protocols. For example, the communication interface 36 can be configured to facilitate wireless data communication for the computing device 30 according to one or more wireless communication standards, such as one or more Institute of Electrical and Electronics Engineers (IEEE) 801.11 standards, ZigBee standards, Bluetooth standards, etc. As another example, the communication interface 36 can be configured to facilitate wired data communication with one or more other devices.

The display 38 can be any type of display component configured to display data. As one example, the display 38 can include a touchscreen display. As another example, the display 38 can include a flat-panel display, such as a liquid-crystal display (LCD) or a light-emitting diode (LED) display. Additionally or alternatively, the display 38 includes a virtual reality display, an extended reality display, and/or an augmented reality display.

The user interface 40 can include one or more pieces of hardware used to provide data and control signals to the computing device 30. For instance, the user interface 40 can include a mouse or a pointing device, a keyboard or a keypad, a microphone, a touchpad, or a touchscreen, among other possible types of user input devices. Generally, the user interface 40 can enable an operator to interact with a graphical user interface (GUI) provided by the computing device 30 (e.g., displayed by the display 38).

Figure 5:
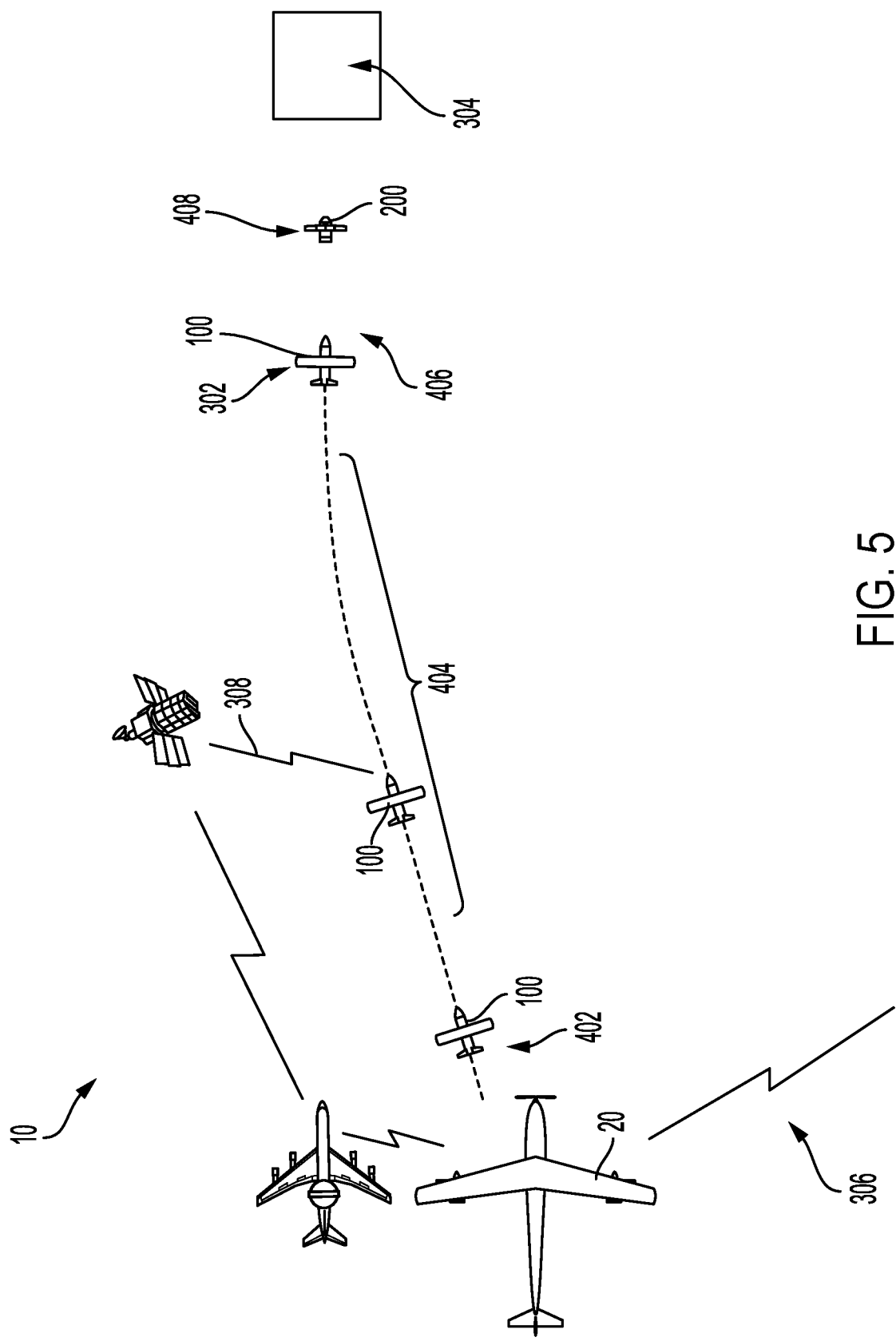
FIG. 5 shows functionality of a system, according to an example.

FIG. 5 shows functionality of the system 10. In various examples, the aircraft 20 is cruising and closing in on one or more second destinations 304 designated for payload delivery. In some examples, the second destinations 304 are changing in time because the intended recipients of the payload 202 are moving on the ground.

Next, the system 10 detaches 402 the first autonomous vehicle 100 from the aircraft 20 during flight of the aircraft 20. For example, a pilot could use a user interface to command the aircraft 20 to release the first autonomous vehicle 100 or to otherwise have the first autonomous vehicle 100 detach from the aircraft 20. In other examples, the aircraft 20 is itself unmanned and the aircraft 20 or the first autonomous vehicle 100 receives a command 306 from another aircraft or a ground station to cause the first autonomous vehicle 100 to detach from the aircraft 20. The first propulsion system 104 could activate prior to, concurrent with, or after the first autonomous vehicle 100 detaches from the aircraft 20.

The first autonomous vehicle 100 then navigates 404 to deliver the second autonomous vehicle 200 to the first destination 302. The first destination 302 can be dynamic and can typically be any location that is within a threshold distance of the second destination 304. The threshold distance can be defined such that the distance between the first destination 302 and the second destination 304 is smaller by at least a predetermined margin than a cruising range of the second autonomous vehicle 200.

To this end, the first autonomous vehicle 100 receives information 308 (e.g., from a satellite, another aircraft, or a ground station) indicating the first destination 302. The information 308 is received prior to and/or while the first autonomous vehicle 100 navigates toward the first destination 302 (e.g., the first destination 302 is updated based on movements of the intended recipients of the payload 202). In this context, the first autonomous vehicle 100 navigates to the first destination 302 in response to receiving the information 308. The first autonomous vehicle 100 receives the information 308 prior to and/or after detaching the first autonomous vehicle 100 from the aircraft 20.

Next, the system 10 detaches 406 the second autonomous vehicle 200 from the first autonomous vehicle 100. The first autonomous vehicle 100 determines that the first autonomous vehicle 100 has reached the first destination 302. In this context, detaching the second autonomous vehicle 200 from the first autonomous vehicle 100 includes detaching the second autonomous vehicle 200 from the first autonomous vehicle 100 in response to determining that the first autonomous vehicle 100 has reached the first destination 302.

The second autonomous vehicle 200 then navigates 408 to deliver the payload 202 to the second destination 304. More particularly, the second autonomous vehicle 200 determines the second destination 304 and responsively navigates the second autonomous vehicle 200 to the second destination 304 in response to determining the second destination 304. The second autonomous vehicle 200 can determine the second destination 304 before and/or after detaching the second autonomous vehicle 200 from the first autonomous vehicle 100.

FIGS. 6-10 are block diagrams of methods 400, 420, 430, 440, and 450 for delivering a payload. As shown in FIGS. 6-10, the methods 400, 420, 430, 440, and 450 include one or more operations, functions, or actions as illustrated by blocks 402, 404, 406, 408, 410, 412, 414, and 416. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Details regarding the blocks 402, 404, 406, 408, 410, 412, 414, and 416 are found above with reference to FIG. 5.

At block 402, the method 400 includes detaching the first autonomous vehicle 100 from an aircraft 20 during flight of the aircraft 20.

At block 404, the method 400 includes navigating the first autonomous vehicle 100 to deliver the second autonomous vehicle 200 to the first destination 302.

At block 406, the method 400 includes detaching the second autonomous vehicle 200 from the first autonomous vehicle 100.

At block 408, the method 400 includes navigating the second autonomous vehicle 200 to deliver the payload 202 to the second destination 304.

At block 410, the method 420 includes receiving the command 306 to detach the first autonomous vehicle 100 from the aircraft 20.

At block 412, the method 430 includes the first autonomous vehicle 100 receiving the information 308 indicating the first destination 302.

At block 414, the method 440 includes determining that the first autonomous vehicle 100 has reached the first destination 302.

At block 416, the method 450 includes the second autonomous vehicle 200 determining the second destination 304.

Examples of the present disclosure can thus relate to one of the enumerated clauses (ECs) listed below.

EC 1 is an apparatus for delivering a payload, the apparatus comprising: a first autonomous vehicle and a second autonomous vehicle that are configured to be coupled to an aircraft, the first autonomous vehicle comprising: a wing; and a first propulsion system configured to deliver the second autonomous vehicle to a first destination, the second autonomous vehicle comprising: a payload; and a second propulsion system configured to deliver the payload to a second destination.

EC 2 is the apparatus of EC 1, the first autonomous vehicle further comprising: a processor; and a non-transitory computer readable medium storing instructions that, when executed by the processor, cause the first autonomous vehicle to deliver the second autonomous vehicle to the first destination.

EC 3 is the apparatus of any of ECs 1-2, the second autonomous vehicle further comprising: a processor; and a non-transitory computer readable medium storing instructions that, when executed by the processor, cause the second autonomous vehicle to deliver the payload to the second destination.

EC 4 is the apparatus of any of ECs 1-3, the first autonomous vehicle further comprising a support structure configured for coupling the wing and the second autonomous vehicle.

EC 5 is the apparatus of any of ECs 1-4, wherein a nose of the second autonomous vehicle extends beyond the wing.

EC 6 is the apparatus of any of ECs 1-5, the first autonomous vehicle comprising a geolocation system configured to determine a location of the first autonomous vehicle.

EC 7 is the apparatus of any of ECs 1-6, the first autonomous vehicle comprising a first tracking system configured to determine that the first autonomous vehicle and the second autonomous vehicle have reached the first destination.

EC 8 is the apparatus of EC 7, the second autonomous vehicle comprising a second tracking system configured to determine that the second autonomous vehicle has reached the second destination.

EC 9 is a system for delivering a payload, the system comprising: an aircraft; and a first autonomous vehicle and a second autonomous vehicle that are coupled to the aircraft, the first autonomous vehicle comprising: a wing; and a first propulsion system configured to deliver the second autonomous vehicle to a first destination, the second autonomous vehicle comprising: a payload; and a second propulsion system configured to deliver the payload to a second destination.

EC 10 is the system of EC 9, the first autonomous vehicle further comprising: a processor; and a non-transitory computer readable medium storing instructions that, when executed by the processor, cause the first autonomous vehicle to deliver the second autonomous vehicle to the first destination.

EC 11 is the system of any of ECs 9-10, the second autonomous vehicle further comprising: a processor; and a non-transitory computer readable medium storing instructions that, when executed by the processor, cause the second autonomous vehicle to deliver the payload to the second destination.

EC 12 is the system of any of ECs 9-11, the first autonomous vehicle further comprising a support structure configured for coupling the wing and the second autonomous vehicle.

EC 13 is the system of any of ECs 9-12, the first autonomous vehicle comprising a geolocation system configured to determine a location of the first autonomous vehicle.

EC 14 is a method for delivering a payload, the method comprising: detaching a first autonomous vehicle from an aircraft during flight of the aircraft; navigating the first autonomous vehicle to deliver a second autonomous vehicle to a first destination; detaching the second autonomous vehicle from the first autonomous vehicle; and navigating the second autonomous vehicle to deliver a payload to a second destination.

EC 15 is the method of EC 14, further comprising: receiving a command to detach the first autonomous vehicle from the aircraft, wherein detaching the first autonomous vehicle from the aircraft comprises detaching the first autonomous vehicle from the aircraft in response to receiving the command.

EC 16 is the method of any of ECs 14-15, further comprising: the first autonomous vehicle receiving information indicating the first destination, wherein navigating the first autonomous vehicle comprises navigating the first autonomous vehicle to the first destination in response to receiving the information.

EC 17 is the method of EC 16, wherein receiving the information comprises receiving the information after detaching the first autonomous vehicle from the aircraft.

EC 18 is the method of any of ECs 14-17, further comprising: determining that the first autonomous vehicle has reached the first destination, wherein detaching the second autonomous vehicle from the first autonomous vehicle comprises detaching the second autonomous vehicle from the first autonomous vehicle in response to determining that the first autonomous vehicle has reached the first destination.

EC 19 is the method of any of ECs 14-18, further comprising: the second autonomous vehicle determining the second destination, wherein navigating the second autonomous vehicle to deliver the payload to the second destination comprises navigating the second autonomous vehicle to the second destination in response to determining the second destination.

EC 20 is the method of EC 19, wherein determining the second destination comprises determining the second destination after detaching the second autonomous vehicle from the first autonomous vehicle.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An apparatus for delivering a payload, the apparatus comprising:
    a first autonomous vehicle and a second autonomous vehicle that are configured to be coupled to an aircraft, the first autonomous vehicle comprising:
       a wing;
       a first tracking system configured to update a first destination of the first autonomous vehicle in response to a second destination of the second autonomous vehicle changing and thereafter make a determination that the first destination is within a threshold distance of the second destination, the first autonomous vehicle being configured to release the second autonomous vehicle at the first destination in response to making the determination and;
       a first propulsion system configured to deliver the second autonomous vehicle to the first destination,
    the second autonomous vehicle comprising:
       a second tracking system configured to update the second destination in response to the second destination changing;
       a payload; and
       a second propulsion system configured to deliver the payload to the second destination after the second destination has been updated.

2. The apparatus of claim 1, the first autonomous vehicle further comprising:
    a processor; and
    a non-transitory computer readable medium storing instructions that, when executed by the processor, cause the first autonomous vehicle to:
    deliver the second autonomous vehicle to the first destination;
    make the determination using the first tracking system; and
    release the second autonomous vehicle in response to making the determination.

3. The apparatus of claim 1, the second autonomous vehicle further comprising:

a processor; and
a non-transitory computer readable medium storing instructions that, when executed by the processor, cause the second autonomous vehicle to deliver the payload to the second destination using the second propulsion system and the second tracking system.

4. The apparatus of claim 1, wherein the second tracking system is configured to navigate the second autonomous vehicle using semi-active radar, active radar, or infrared heat-seeking capabilities of the second tracking system.

5. The apparatus of claim 1, wherein the second propulsion system is configured to navigate the second autonomous vehicle using a solid-propellant rocket.

6. A system for delivering a payload, the system comprising:
an aircraft; and
a first autonomous vehicle and a second autonomous vehicle that are coupled to the aircraft, the first autonomous vehicle comprising:
a wing;
a first tracking system configured to update a first destination of the first autonomous vehicle in response to a second destination of the second autonomous vehicle changing and thereafter make a determination that the first destination is within a threshold distance of the second destination, the first autonomous vehicle being configured to release the second autonomous vehicle at the first destination in response to making the determination and;
a first propulsion system configured to deliver the second autonomous vehicle to the first destination,
the second autonomous vehicle comprising:
a second tracking system configured to update the second destination in response to the second destination changing;
a payload; and
a second propulsion system configured to deliver the payload to the second destination after the second destination has been updated.

7. The system of claim 6, the first autonomous vehicle further comprising:
a processor; and
a non-transitory computer readable medium storing instructions that, when executed by the processor, cause the first autonomous vehicle to:
deliver the second autonomous vehicle to the first destination;
make the determination using the first tracking system; and
release the second autonomous vehicle in response to making the determination.

8. The system of claim 6, the second autonomous vehicle further comprising:
a processor; and
a non-transitory computer readable medium storing instructions that, when executed by the processor, cause the second autonomous vehicle to deliver the payload to the second destination using the second propulsion system and the second tracking system.

9. The system of claim 6, the first autonomous vehicle further comprising a support structure configured for coupling the wing and the second autonomous vehicle.

10. The system of claim 6, the first autonomous vehicle comprising a geolocation system configured to determine a location of the first autonomous vehicle.

11. The system of claim 6, wherein the second tracking system is configured to navigate the second autonomous vehicle using semi-active radar, active radar, or infrared heat-seeking capabilities of the second tracking system.

12. The system of claim 6, wherein the second propulsion system is configured to navigate the second autonomous vehicle using a solid-propellant rocket.

13. The system of claim 6, further comprising:
a third autonomous vehicle and a fourth autonomous vehicle that are coupled to the aircraft, the third autonomous vehicle comprising:
a second wing;
a third tracking system configured to update a third destination of the third autonomous vehicle in response to a fourth destination of the fourth autonomous vehicle changing and thereafter make a second determination that the third destination is within a second threshold distance of the fourth destination, the third autonomous vehicle being configured to release the fourth autonomous vehicle in response to making the second determination and;
a third propulsion system configured to deliver the fourth autonomous vehicle to the third destination,
the fourth autonomous vehicle comprising:
a fourth tracking system configured to update the fourth destination in response to the fourth destination changing;
a second payload; and
a fourth propulsion system configured to deliver the second payload to the fourth destination after the fourth destination has been updated.

14. A method for delivering a payload, the method comprising:
detaching a first autonomous vehicle from an aircraft during flight of the aircraft;
updating a first destination of the first autonomous vehicle in response to determining that a second destination of a second autonomous vehicle changed;
navigating, using a first propulsion system of the first autonomous vehicle, the first autonomous vehicle to deliver the second autonomous vehicle to the first destination after updating the first destination;
detaching the second autonomous vehicle from the first autonomous vehicle at the first destination in response to making a determination, by the first tracking system of the first autonomous vehicle, that the first destination is within a threshold distance of the second destination after updating the first destination;
updating the second destination based on the second destination changing after detaching the second autonomous vehicle; and
navigating, using a second propulsion system and a second tracking system of the second autonomous vehicle, the second autonomous vehicle to deliver a payload to the second destination as updated after detaching the second autonomous vehicle.

15. The method of claim 14, further comprising:
receiving a command to detach the first autonomous vehicle from the aircraft,
wherein detaching the first autonomous vehicle from the aircraft comprises detaching the first autonomous vehicle from the aircraft in response to receiving the command.

16. The method of claim 14, further comprising:
the first autonomous vehicle receiving information indicating the first destination, wherein navigating the first autonomous vehicle comprises navigating the first autonomous vehicle to the first destination in response to receiving the information.

17. The method of claim 16, wherein receiving the information comprises receiving the information after detaching the first autonomous vehicle from the aircraft.

18. The method of claim 14, wherein making the determination comprises making the determination using semi-active radar, active radar, or infrared heat-seeking capabilities of the first autonomous vehicle.

19. The method of claim 14, wherein navigating the second autonomous vehicle to deliver the payload to the second destination comprises using semi-active radar, active radar, or infrared heat-seeking capabilities of the second autonomous vehicle.

20. The method of claim 14, wherein navigating the second autonomous vehicle to deliver the payload to the second destination comprises using a solid-propellant rocket.

\* \* \* \* \*